(12) United States Patent
Yamaguchi et al.

(10) Patent No.: US 9,537,433 B2
(45) Date of Patent: Jan. 3, 2017

(54) MOTOR DRIVE DEVICE

(71) Applicant: ASMO CO., LTD., Kosai, Shizuoka-pref. (JP)

(72) Inventors: Kosuke Yamaguchi, Gamagori (JP); Daijiro Saigusa, Hamamatsu (JP)

(73) Assignee: ASMO CO., LTD., Kosai (JP)

( * ) Notice: Subject to any disclaimer, the term of this patent is extended or adjusted under 35 U.S.C. 154(b) by 0 days.

(21) Appl. No.: 14/663,466

(22) Filed: Mar. 20, 2015

(65) Prior Publication Data
US 2015/0280620 A1  Oct. 1, 2015

(30) Foreign Application Priority Data

Mar. 25, 2014 (JP) ................................. 2014-062579

(51) Int. Cl.
*H02P 6/06* (2006.01)
*H02P 6/00* (2016.01)

(52) U.S. Cl.
CPC ................. *H02P 6/002* (2013.01); *H02P 6/28* (2016.02)

(58) Field of Classification Search
CPC ........................................................ H02P 6/002

USPC ............................. 318/400.3, 812, 723, 779
See application file for complete search history.

(56) References Cited

U.S. PATENT DOCUMENTS 7,612,522 B2   11/2009  Williams et al.

FOREIGN PATENT DOCUMENTS

JP           2011-50202 A     3/2011

*Primary Examiner* — Erick Glass
(74) *Attorney, Agent, or Firm* — SOLARIS Intellectual Property Group, PLLC

(57) ABSTRACT

There is provided a motor drive device including, a current detection section that detects current flowing between a power source and an inverter circuit generating voltage to be supplied to a motor, a voltage control section that outputs a first control signal to cause the inverter circuit to generate a voltage for rotating the motor at a rotation speed based on an instructed value, and a rotation speed suppression section that, in cases in which current, detected by the current detection section at a timing at which a voltage generated by the inverter circuit rises from low level to high level, is a predetermined threshold value or higher, outputs a second control signal to the voltage control section to cause the inverter circuit to generate a voltage for rotating the motor at a lower rotation speed than the rotation speed based on the instructed value.

3 Claims, 5 Drawing Sheets

MOTOR DRIVE DEVICE

CROSS-REFERENCE TO RELATED APPLICATION

This application claims priority under 35 USC 119 from Japanese Patent application No. 2014-062579 filed on Mar. 25, 2014, the disclosure of which is incorporated by reference herein.

BACKGROUND

Technical Field

The present disclosure relates to a motor drive device.

Related Art

As a blower motor employed to convey air in a vehicle air conditioner, sometimes brushless DC motors are employed in which a rotor configured by a permanent magnet tracks a rotating magnetic field generated by a stator, provided along the circumferential direction of the rotor, and rotates. Since, unlike brushed DC motors, brushless DC motors do not have a sliding configuration, power consumption is low compared to brushed DC motors, and are compatible with faster rotation speeds.

When the number of revolutions are increased in the motor, the load on the motor and a motor drive device that drives the motor increases. In the motor drive device of the brushless DC motor, for example, the load on the motor and the motor drive device is detected from a power source current value detected by a current sensor, provided between an inverter circuit generating voltage applied to the motor by switching and a battery that is a power source. Control is then performed to lower a duty ratio of voltage applied to the motor in cases in which there is a possibility of overload.

However, spikes in noise are generated sporadically in the current between the power source and the inverter circuit, such that there is a possibility that the detection of the current sensor is affected by the noise.

Japanese Patent Application Laid-Open (JP-A) No. 2011-50202 describes an electric motor drive device in which sporadic noise is eliminated by processing a signal output from the current sensor using a low pass filter to smooth the signal.

However, in the electric drive device described in JP-A No. 2011-50202, there is a possibility of significant error, such that the detected current value is lower than the actual current value, due to high frequency components of the signal being excessively eliminated by the low pass filter. In cases of significant error such that the detected current value is lower than the actual current value, strict determination criteria for overload and prioritized protection of the motor and drive device are required. There is accordingly a possibility that the duty ratio of current applied to the motor is more frequently lowered, impairing efficient operation of the motor. There is also a possibility that the product incurs an increase in cost due to mounting a filter such as the low pass filter to the circuit.

SUMMARY

In consideration of the above circumstances, the present disclosure provides a motor drive device capable of detecting a power source current value with high precision and suitably avoiding overload using a simple configuration.

A first aspect of the present disclosure is a motor drive device including a current detection section that detects current flowing between a power source and an inverter circuit generating voltage to be supplied to a motor, a voltage control section that outputs a first control signal to cause the inverter circuit to generate a voltage for rotating the motor at a rotation speed based on an instructed value, and a rotation speed suppression section that, in cases in which current detected by the current detection section at a timing at which a voltage generated by the inverter circuit rises from low level to high level, the timing being detected from a change in the first control signal output by the voltage control section, is a predetermined threshold value or higher, outputs a second control signal to the voltage control section to cause the inverter circuit to generate a voltage for rotating the motor at a lower rotation speed than the rotation speed based on the instructed value.

In the motor drive device according to the first aspect, current detected by the current detection section is sampled at the timing at which the voltage generated by the inverter circuit rises from low level to high level, and noise components included in the signal detected by the current detection section are thereby eliminated from the sampling.

Moreover, in the motor drive device according to the first aspect, the power source current value between the power source and the inverter circuit can be detected with high precision by eliminating by noise components, enabling a suitable overload determination to be made based on the detected power source current value. Thus in this motor drive device, the power source current value can be detected with high precision and overload can be suitably avoided using a simple configuration.

A second aspect of the present disclosure is a motor drive device of the first aspect, wherein the rotation speed suppression section takes an increase in duty ratio indicated by the first control signal as the timing at which voltage generated by the inverter circuit rises from low level to high level.

In the motor drive device according to the second aspect, the timing for sampling the current is determined using a Pulse Width Modulation (PWM) signal, that is necessary for controlling the motor, thus enabling the power source current value to be detected with high precision and overload to be suitably avoided using a simple configuration.

A third aspect of the present disclosure is a motor drive device of the first aspect or the second aspect, wherein the rotation speed suppression section detects the timing at which voltage generated by the inverter circuit rises from low level to high level and after retaining the current detected by the current detection section at the timing as a peak value, then repeats processing to detect the timing and to acquire the current detected by the current detection section at the timing, and, in cases in which the acquired current exceeds the peak value, retains the current exceeding the peak value as a new peak value, and compares the newest peak value against the predetermined threshold value.

In the motor drive device according to the third aspect, sampling of the current is repeated at the timing at which the voltage generated by the inverter circuit rises, and the newly sampled current is set as the peak value in cases in which the newly sampled current is greater than the current sampled previously. The newest peak value is then compared against the specific threshold value and an overload determination is made, thus enabling the power source current value to be detected with high precision and overload to be suitably avoided using a simple configuration.

BRIEF DESCRIPTION OF THE DRAWINGS

Exemplary embodiments of the present disclosure will be described in detail based in the following figures, wherein.

DETAILED DESCRIPTION

Figure 1:
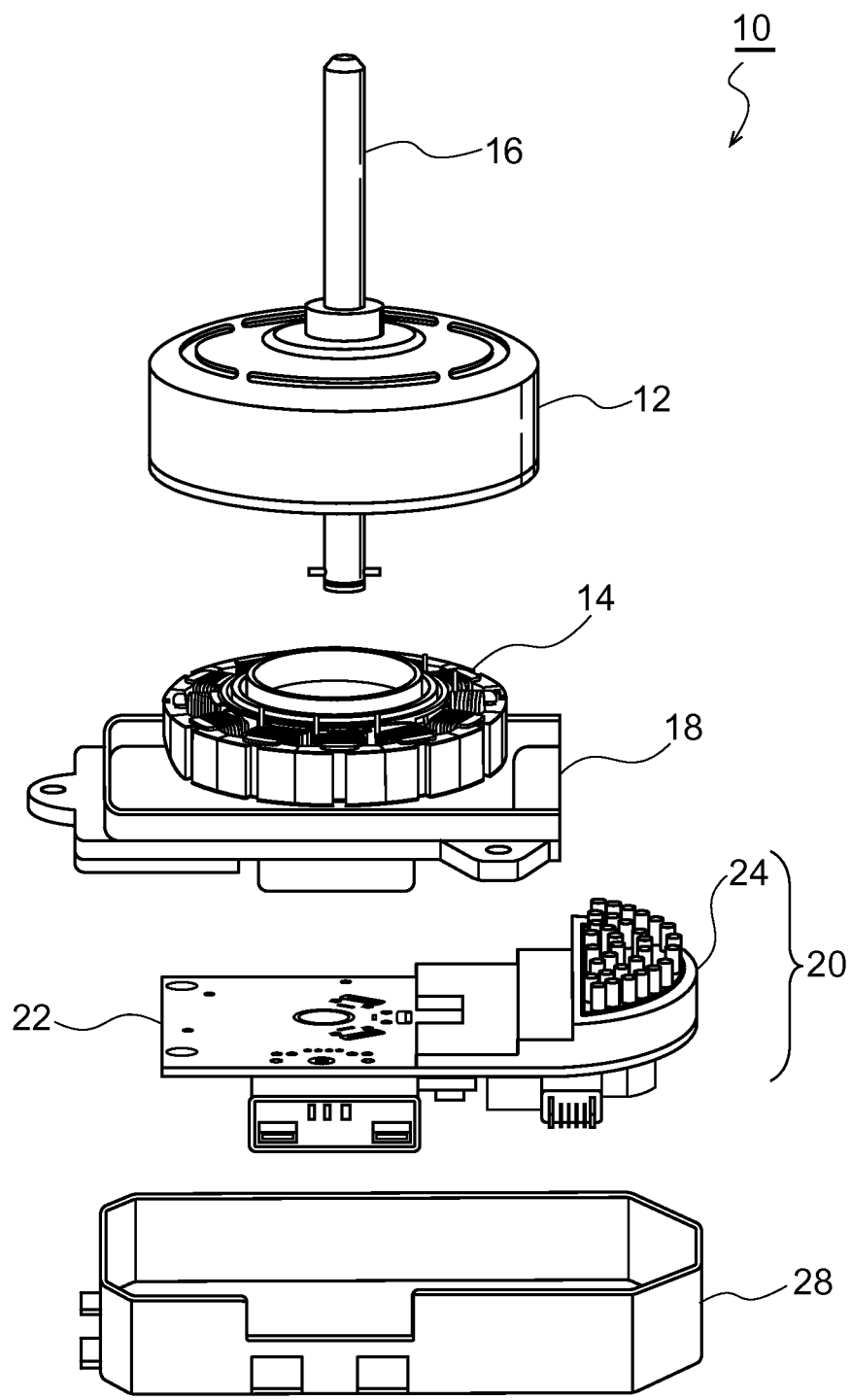
FIG. 1 is a schematic view illustrating a configuration of a motor unit employing a motor drive device according to an exemplary embodiment of the present disclosure.

FIG. 1 is a schematic view illustrating a configuration of a motor unit 10 employing a motor drive device 20 according to an exemplary embodiment. The motor unit 10 according to the present exemplary embodiment in FIG. 1 is, for example, what is known as a blower motor unit, employed to convey air in a vehicle air conditioner.

The motor unit 10 according to the present exemplary embodiment is a brushless DC motor (hereafter referred to as "motor"), and is a three phase motor with an outer rotor structure, with a rotor 12 provided to the outside of a stator 14. The stator 14 is an electromagnet configured by a conductive wire wound around a core member, and is configured with three phases, namely a U phase, a V phase, and a W phase. A motor drive device 20, described later, controls to switch the polarity of the magnetic field generated by the electromagnet, such that the U phase, the V phase, and the W phase of the stator 14 respectively generate what is known as a rotating magnetic field.

A rotor magnet (not illustrated in the drawings) is provided inside the rotor 12. The rotor magnet rotates the rotor 12 according to the rotating magnetic field generated by the stator 14.

The rotor 12 is provided with a shaft 16 that rotates as a unit with the rotor 12. Although not illustrated in FIG. 1, in the present exemplary embodiment the shaft 16 is provided with a multi-bladed fan, for example what is known as a sirocco fan. The multi-bladed fan rotates together with the shaft 16, enabling air to be conveyed in the vehicle air conditioner.

The stator 14 is attached to the motor drive device 20 through an upper case 18. The motor drive device 20 includes a circuit board 22 of the motor drive device 20, and a heat sink 24 that dissipates heat generated by elements on the circuit board 22.

A lower case 28 is attached to the motor unit 10 configured including the rotor 12, the stator 14, and the motor drive device 20.

Figure 2:
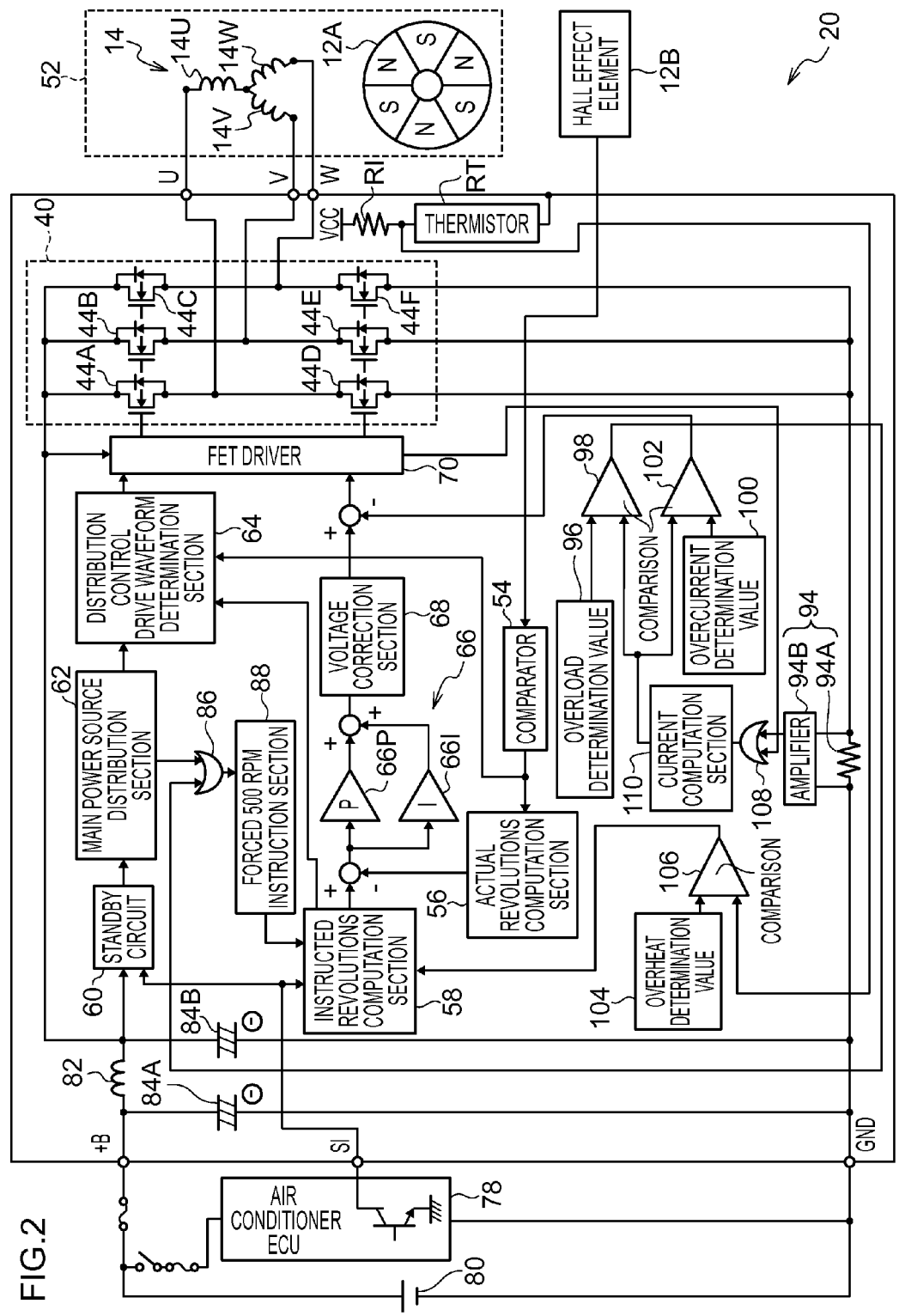
FIG. 2 is a diagram schematically illustrating a motor drive device according to an exemplary embodiment of the present disclosure.

FIG. 2 is a schematic view illustrating the motor drive device 20 according to the present exemplary embodiment. An inverter circuit 40 illustrated in FIG. 2 uses Field Effect Transistors (FETs) to switch the power supplied to coils of the stator 14 of a motor 52. For example, inverter FETs 44A, 44D, inverter FETs 44B, 44E, and inverter FETs 44C, 44F respectively switch the power supplied to a U phase coil 14U, a V phase coil 14V, and a W phase coil 14W.

The drains of each of the inverter FETs 44A, 44B, 44C are connected to the positive electrode of an on-board battery 80 through a choke coil 82. The sources of each of the inverter FETs 44D, 44E, 44F are connected to the negative electrode of the battery 80.

In addition to the inverter circuit 40, the circuit board of the motor drive device 20 of the present exemplary embodiment is also mounted with components including a comparator 54, an actual revolutions computation section 56, an instructed revolutions computation section 58, a standby circuit 60, a main power source distribution section 62, a distribution control drive waveform determination section 64, a PI control section 66, a voltage correction section 68, and a FET driver 70.

The circuit board of the motor drive device 20 of the present exemplary embodiment is further mounted with components including the choke coil 82 and smoothing capacitors 84A, 84B, and is connected to an air conditioner Electronic Control Unit (ECU) 78 and the battery 80. Together with the battery 80, the choke coil 82 and the smoothing capacitors 84A, 48B configure a substantially DC power source. The air conditioner ECU 78 is an electronic control unit of the vehicle air conditioner. When the air conditioner is switched ON by a user operating a switch, the air conditioner ECU 78 transmits an instruction to the motor drive device 20 such that the motor 52 is actuated. When the user adjusts the airflow rate of the vehicle air conditioner, a signal instructing a rotation speed of the motor 52 (rotor 12) is input to the motor drive device 20 through the air conditioner ECU 78.

In the present exemplary embodiment, a Hall element 12B detects the magnetic field of a sensor magnet 12A that is provided coaxially to the shaft 16. The comparator 54 is a device that converts the analogue output of the Hall element 12B into a digital signal, and the actual revolutions computation section 56 computes the actual rotation speed of the rotor 12 based on the digital signal output from the comparator 54. The instructed revolutions computation section 58 also computes a target rotation speed based on an instruction signal from the air conditioner ECU 78, for example. In the present exemplary embodiment, the target rotation speed is approximately from 1000 rpm to 5000 rpm.

When, based on the target rotation speed computed by the instructed revolutions computation section 58 and the actual rotation speed computed by the actual revolutions computation section 56, the actual rotation speed is to be changed to the target rotation speed, the PI control section 66 computes a voltage for application to the coils of the stator 14 using what is known as PI control. The PI control section 66 includes a deviation proportion section 66P that computes a voltage for the target rotation speed based on a proportional relationship between a deviation between the target rotation speed and the actual rotation speed, and a deviation between the voltage at the target rotation speed and the voltage at the actual rotation speed. The PI control section 66 also includes a deviation integration section 66I that uses deviation integration to cancel out residual deviation in cases in which a residual deviation arises from the proportional relationship alone. The voltage correction section 68 corrects the voltage applied to the coils of the stator 14 based on the computation results of the PI control section 66.

The standby circuit 60 is a circuit that controls power supply from the battery 80 to each respective section. The main power source distribution section 62 turns ON the power source to the motor drive device under the control of the standby circuit 60. The main power source distribution section 62 also outputs an instruction through an OR circuit 86 to a forced 500 rpm instruction section 88 at motor 52 start-up, namely when the motor 52 is rotated from a rotation speed of 0 rpm. The forced 500 rpm instruction section 88 controls the instructed revolutions computation section 58 such that the target rotation speed of the motor 52 is 500 rpm for a specific duration on start-up. The instructed revolutions computation section 58 outputs a signal corresponding to 500 rpm to the PI control section 66. Note that the specific duration is, for example, from 500 ms to 1000 ms.

After the specific duration has elapsed, control of the instructed revolutions computation section 58 by the forced 500 rpm instruction section 88 ends, and the instructed revolutions computation section 58 outputs to the PI control section 66 a signal according to the target rotation speed computed based on the instruction signal from the air conditioner ECU 78.

When supplied with power through the standby circuit 60 and the main power source distribution section 62, the distribution control drive waveform determination section 64 derives the position of the rotor 12 based on the digital signal output from the comparator 54, and determines a drive waveform of the voltage for application to the coils of the stator 14 based on the position of the rotor 12 and the target rotation speed computed by the instructed revolutions computation section 58.

Based on the drive waveform determined by the distribution control drive waveform determination section 64 and a voltage value corrected by the voltage correction section 68, the FET driver 70 generates and outputs to the inverter circuit 40 a PWM signal that controls switching of the inverter circuit 40.

The circuit board of the motor drive device 20 according to the present exemplary embodiment is also mounted with a chip thermistor RT, of which one terminal is applied with a control voltage Vcc through a resistor R1 and the other terminal is connected to ground, and across which a resistance value changes according to the temperature of the circuit board. The chip thermistor RT employed in the present exemplary embodiment is a Negative Temperature Coefficient (NTC) thermistor in which resistance decreases with increasing temperature. The resistor R1 and the chip thermistor RT configure a type of voltage divider circuit, in which, when the resistance value of the chip thermistor RT decreases as the temperature of the circuit board increases, the voltage of a signal output from between the resistor R1 and the chip thermistor RT also decreases according to the resistance value of the chip thermistor RT. Note that in the present exemplary embodiment, a Positive Temperature Coefficient (PTC) thermistor in which the resistance value increases with increasing temperature may be employed in combination with an inverter circuit.

In an overheated state determination section 106, a signal from the chip thermistor RT is compared against an overheat determination value output by an overheat determination value output section 104. In cases in which the voltage of the signal output by the chip thermistor RT is an overheat determination value or lower, the instructed revolutions computation section 58 is controlled such that the target rotation speed is forcibly set to 0 rpm. As previously described, the chip thermistor RT is a type in which resistance decreases with increasing temperature, such that in cases in which the voltage of the signal output from the voltage divider circuit configured by the resistor R1 and the chip thermistor RT is the overheat determination value or less, determination is made that the circuit is overheating. The overheat determination value is varied according to the elements mounted to the circuit board, the position of the chip thermistor RT, and so on, and is set as an example at the voltage value output by the voltage divider circuit configured by the resistor R1 and the chip thermistor RT at 145° C.

A current detection section 94 is provided between the sources of the respective inverter FETs 44D, 44E, 44F and the battery 80. The current detection section 94 includes a shunt resistor 94A with a small resistance value of approximately 0.2 Ω to several Ω, and an amplifier 94B that detects the electrical potential difference across the shunt resistor 94A and amplifies the detected electrical potential difference. A signal output by the amplifier 94B is input to an OR circuit 108. The PWM signal from the FET driver 70 is also input to the OR circuit 108.

A current computation section 110 computes a power source current value, this being the current value between the inverter circuit 40 and the battery 80, based on the signal from the current detection section 94 and the PWM signal that are input to the OR circuit 108. The power source current value computed by the current computation section 110 is input to both the overload determination section 98 and the overcurrent determination section 102.

The overcurrent determination section 102 compares the signal output from the amplifier 94B against an overcurrent determination value output from an overcurrent determination value output section 100. When the signal output from the amplifier 94B is the overcurrent determination value or greater, the overcurrent determination section 102 forcibly stops the output of the voltage correction section 68, thereby stopping rotation of the motor 52. Further, the overload determination section 98 compares the signal output from the amplifier 94B against an overload determination value output from an overload determination value output section 96. When the signal output from the amplifier 94B is the overload determination value or greater, the overload determination section 98 performs control to instruct the forced 500 rpm instruction section 88 through the OR circuit 86, and the rotation speed of the motor 52 is forcibly reduced to 500 rpm, that serves as a specific rotation speed.

In the present exemplary embodiment, the overcurrent determination value is a value exceeding the overload determination value, and is a current value at which rotation of the motor 52 has to be stopped urgently for circuit protection. The specific values of the overcurrent determination value and the overload determination value depend on the specification of the motor 52, and so the specific values thereof are determined individually for each motor specification through simulations and testing at the design stage.

After an overcurrent state has been determined and rotation of the motor 52 has been stopped, application of voltage to the coils of the stator 14 is interrupted for a specific duration, thereby preventing circuit burnout. The specific duration is for example 100 ms, with the application of voltage to the coils interrupted for this period of 100 ms. Voltage application is then restarted, and voltage application is once again interrupted if the overcurrent determination value is exceeded. If this repeating state persists for a specific number of times, the risk of circuit burnout is determined to be high, and voltage reapplication is abandoned.

When an overloaded state has been determined and the rotation speed of the motor 52 has been set to 500 rpm, the rotation speed of the motor 52 is controlled at 500 rpm until the current value detected by the current detection section 94 drops below the overload determination value. After the current value detected by the current detection section 94 has dropped below the overload determination value, the voltage applied to the coils of the stator 14 is controlled to rotate the motor 52 at the target rotation speed computed by the instructed revolutions computation section 58.

Note that in the present exemplary embodiment, a single integrated circuit may be employed for a configuration including the comparator 54, the actual revolutions computation section 56, the instructed revolutions computation section 58, the standby circuit 60, the main power source distribution section 62, the distribution control drive waveform determination section 64, the PI control section 66, the voltage correction section 68, the FET driver 70, the OR circuit 86, the forced 500 rpm instruction section 88, the overload determination section 98, the overcurrent determination section 102, the overheated state determination section 106, the OR circuit 108, the current computation section 110, and so on. Alternatively, an integrated circuit may be employed for the FET driver 70 that is separate to an integrated circuit including the actual revolutions computation section 56, the instructed revolutions computation section 58, the voltage correction section 68, the forced 500 rpm instruction section 88, the overload determination section 98, the overcurrent determination section 102, the overheated state determination section 106, and the current computation section 110, and so on.

Figure 3:
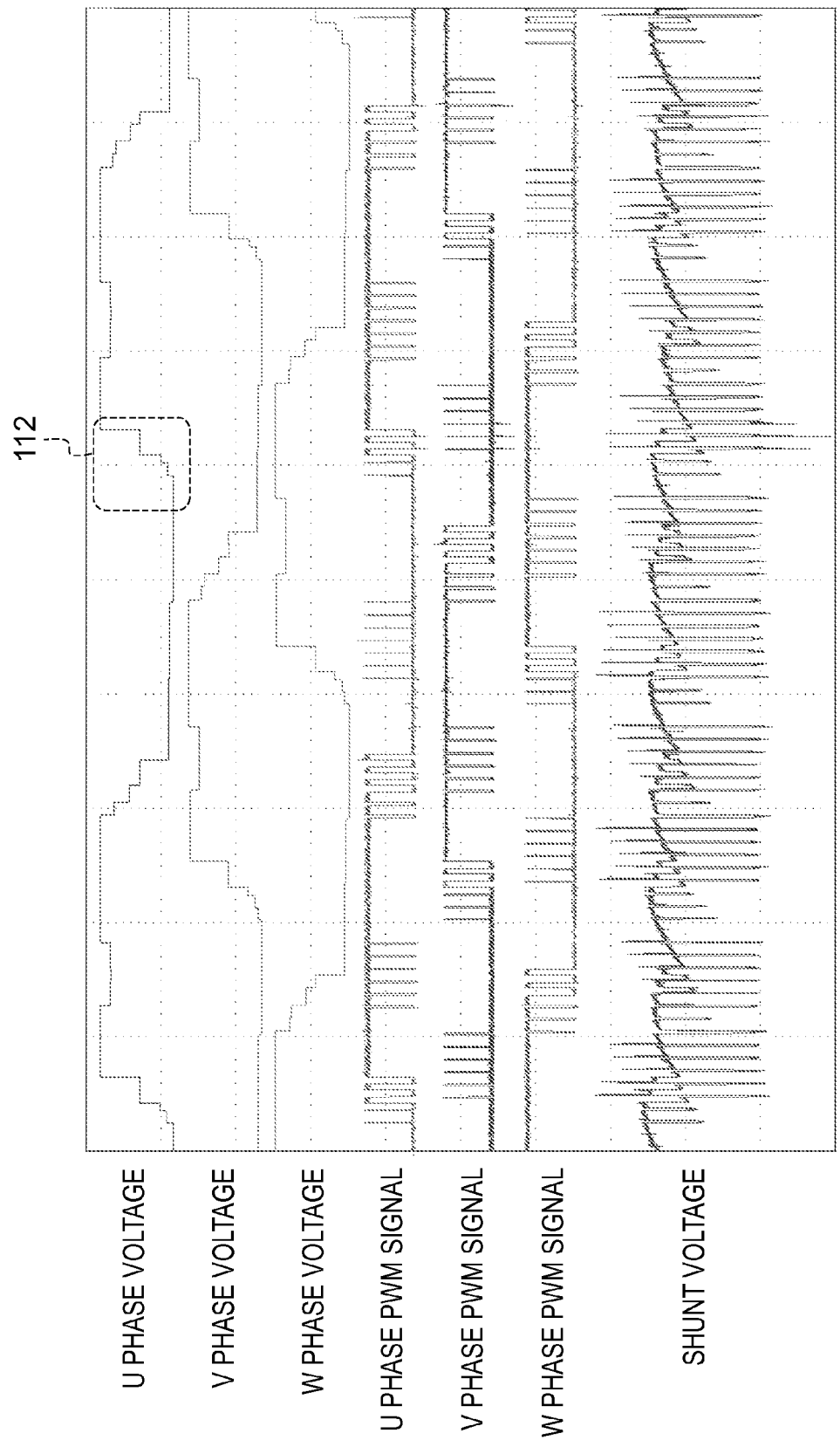
FIG. 3 is a schematic view illustrating an example of U phase voltage, V phase voltage, and W phase voltage that are voltages applied to coils, PWM signals of the respective phases, and a shunt voltage that is an electrical potential difference across a shunt resistor, in an exemplary embodiment of the present disclosure.

FIG. 3 is a schematic view illustrating an example of U phase voltage, V phase voltage, and W phase voltage that are voltages applied to the coils 14U, 14V, 14W respectively, PWM signals for each phase, and a shunt voltage that is the electrical potential difference across the shunt resistor 94A. In the shunt voltage in FIG. 3 relating to measurement of the power source current value, sharp triangular wave shaped noise is generated. In the present exemplary embodiment, the power source current value is computed with excellent precision by sampling the shunt voltage or a signal of shunt voltage processed by the amplifier 94B, avoiding the noise generated in the shunt voltage.

Figure 4:
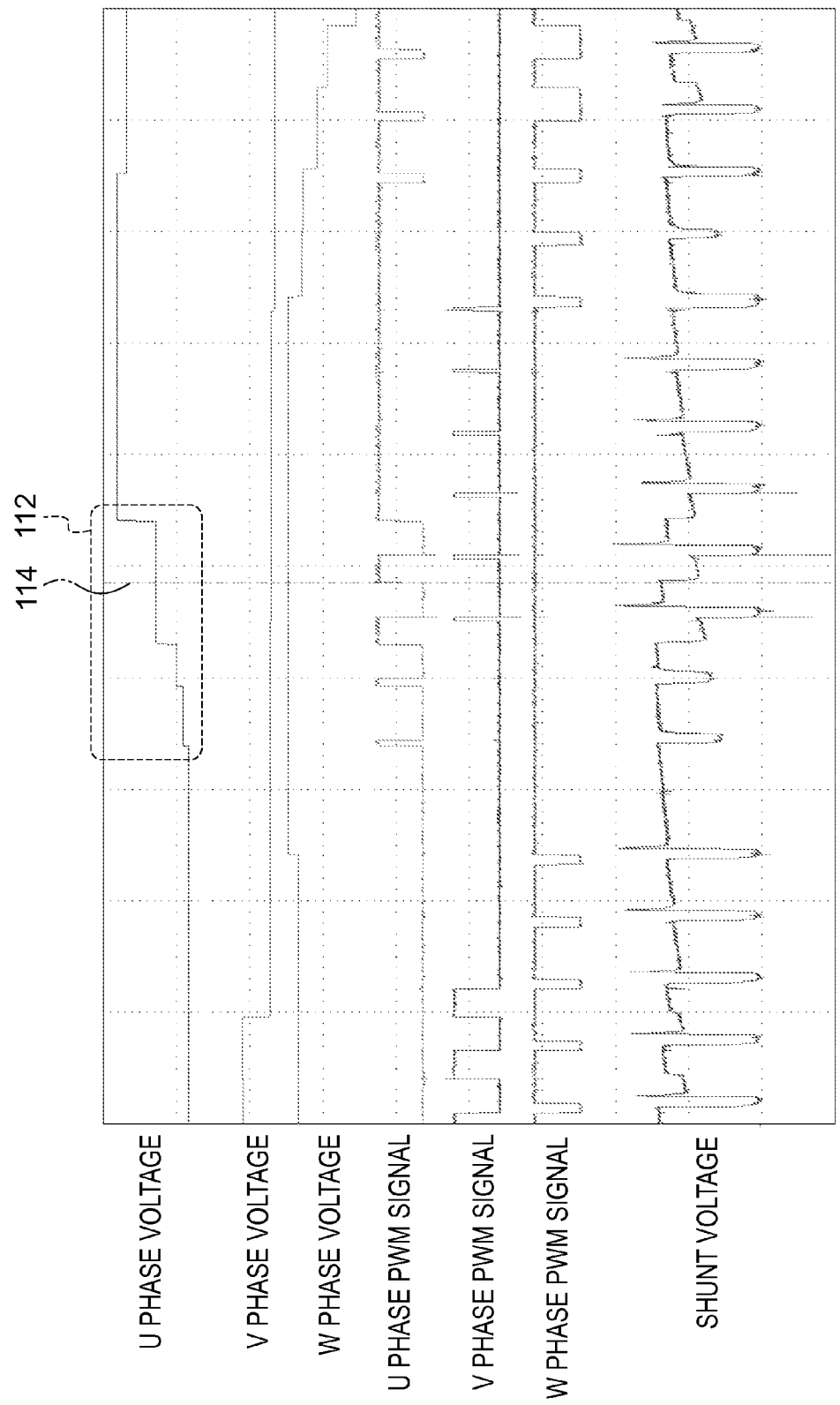
FIG. 4 is an enlarged view of FIG. 3, focusing on a trapezoid slope section in an exemplary embodiment of the present disclosure.

In FIG. 3, the waveforms of the U phase voltage, the V phase voltage, and the V phase voltage each exhibit a substantially trapezoidal shape, and a trapezoid slope section 112 is formed at locations corresponding to a side of the trapezoidal shape, this being when the respective voltage transitions from low level to high level. FIG. 4 is an enlarged view of FIG. 3, focusing on the trapezoid slope section 112. In FIG. 4, shunt voltage noise is avoided at a voltage rise timing 114, this being a timing when the trapezoid slope section 112 rises.

In the present exemplary embodiment, the current computation section 110 illustrated in FIG. 2 detects the voltage rise timing 114 based on a change in the PWM signal output by the FET driver 70. Various methods are conceivable for detecting the voltage rise timing 114. In the present exemplary embodiment as an example, the voltage rise timing is when a duty ratio indicated by the U phase PWM signal tends toward an increase as illustrated in FIG. 4. Detection of whether or not the duty ratio indicated by the U phase PWM tends toward an increase can be made, for example, by measuring the duty ratio of the U phase PWM signal using an 8-bit timer or a 16-bit timer.

The current computation section 110 samples the signal output by the current detection section 94 at the detected voltage rise timing 114. The current computation section 110 also computes current using the signal sampled at the voltage rise timing 114.

As illustrated in FIG. 4, signal components other than sharp triangular wave shaped noise can be acquired at the voltage rise timing 114, thus enabling current to be computed without smoothing the signal using a low pass filter or the like. This enables the power source current value to be computed with high precision, by avoiding any error that may occur due to smoothing using a low pass filter. Moreover, there is no need to add a circuit of a low pass filter or the like since the sampling timing is determined using the PWM signal that is necessary for drive control of the motor 52, enabling the power source current value to be computed with excellent precision using a simple configuration.

Moreover, as illustrated in FIG. 4, the shunt voltage exhibits a slight tendency to increase directly after the sharp triangular wave shaped noise, and then decrease. As illustrated in FIG. 4, sampling the shunt voltage that has become the maximum after the sharp triangular wave shaped noise enables the peak value of the fluctuating power source current value to be computed.

In the present exemplary embodiment, a signal with as high a level as possible is acquired from signal components other than spiking noise by processing to update the peak value of the sampled value from the shunt voltage or the shunt voltage signal processed by the amplifier 94B.

Figure 5:
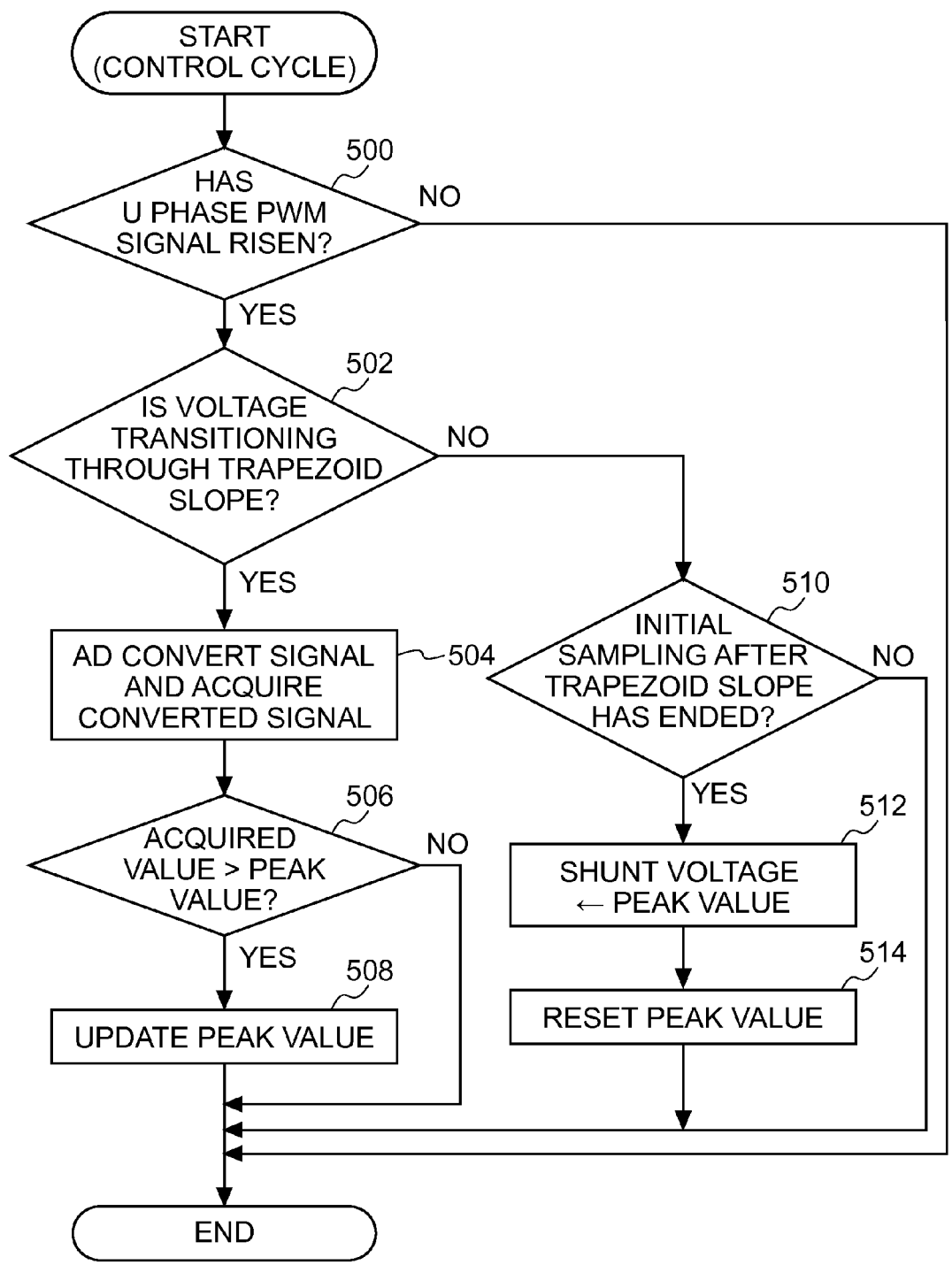
FIG. 5 is a flowchart illustrating an example of processing for extracting a high level signal from a signal output by a current detection section, in an exemplary embodiment of the present disclosure.

FIG. 5 is a flowchart illustrating an example of processing for extracting a high level signal from the signal output by the current detection section 94. The processing in FIG. 5 is repeated every specific cycle measured by a base clock, an 8-bit timer or a 16-bit timer on the integrated circuit.

At step 500 in FIG. 5, determination is made whether or not the voltage rise timing 114 of the PWM signal acquired from the FET driver 70 can be detected. In cases of affirmative determination, at step 502, determination is made whether or not voltage is transitioning through the trapezoid slope section 112 based on the duty ratio indicated by the PWM signal. Processing ends in cases of negative determination at step 500.

In cases of affirmative determination at step 502, at step 504, the signal value from the current detection section 94 is converted into a digital signal and acquired. At step 506, the value acquired at step 504 is compared against a previous peak value retained by storage means such as Random Access Memory (RAM), and determination is made whether or not the acquired value is larger. In cases of affirmative determination at step 506, at step 508, the peak value is updated using the value acquired at step 504, and processing ends. In cases of negative determination at step 506, processing ends without the peak value being updated.

In cases of negative determination at step 502, determination is made at step 510 as to whether or not this is initial sampling after the trapezoid slope section 112 has ended. In cases of affirmative determination, at step 512, the shunt voltage acquired by sampling or the output signal of the current detection section 94 is retained as the peak value, the peak value is reset at step 514, and processing ends. The overload determination section 98 and the overcurrent determination section 102 compare the power source current value indicated by the newest peak value against the specific threshold values, determine whether or not there is overload and whether or not there is overcurrent, and control the voltage applied to the motor 52 according to the determination.

Note that in the present exemplary embodiment, the voltage rise timing 114 is determined based on the U phase PWM signal; however the voltage rise timing 114 may be determined based on the V phase or the W phase PWM signal.

As explained above, in the present exemplary embodiment, sampling is repeated while determining the voltage rise timing 114 from the PWM signal and sampling the signal, and while updating the peak value of the sampled value. The peak value of the fluctuating power source current value can be computed with high precision by using the updated newest peak value, thus enabling overload of the motor 52 and the motor drive device 20 to be suitably avoided.

What is claimed is:

1. A motor drive device comprising:
an inverter circuit that generates voltage to drive a motor using current supplied from a power source;
a current detection section that detects the current flowing between the power source and the inverter circuit;
a voltage control section that outputs a control signal to cause the inverter circuit to generate the voltage for driving the motor at a predetermined rotation speed; and
a rotation speed suppression section that suppress a rotation speed of the motor,
wherein the rotation speed suppression section executes the following:
(i) obtaining a value of the current as a peak value, the current detected by the current detection section at a timing at which the control signal rises from low level to high level,
(ii) performing a first determination regarding whether or not the peak value reaches a threshold value or higher,
(iii) outputting an instruction to the voltage control section to reduce the rotation speed of the motor, if the result of the first determination is positive.

2. The motor drive device of claim 1, wherein:
the rotation speed suppression section performs a second determination regarding whether or not the duty ratio indicated by the control signal is increasing, and
the rotation speed suppression section performs obtaining the peak value, if the result of the second determination is positive.

3. The motor drive device of claim 1, wherein:
the rotation speed suppression section further executes the following;
(iv) retaining the peak value that is obtained,
(v) performing a third determination regarding whether or not a value of the current exceeds the retained peak value, the current detected by the current detection section at a timing at which the control signal newly rises from the low level to the high level,
(vi) retaining the value of the current as a new peak value, if the result of the third determination is positive,
(vii) performing the first determination using the newest peak value.

* * * * *